United States Patent [19]

Strong

[11] 3,871,816

[45] Mar. 18, 1975

[54] DRIVE MECHANISM FOR PASSING CONTINUOUS STRIP THROUGH AN OVEN

[75] Inventor: Grant F. Strong, Wabash, Ind.

[73] Assignee: The General Tire & Rubber Company, Akron, Ohio

[22] Filed: Aug. 3, 1973

[21] Appl. No.: 385,620

[52] U.S. Cl............................ 432/59, 34/153, 432/8
[51] Int. Cl................................................ F27b 9/28
[58] Field of Search............ 432/8, 59; 34/152, 153, 34/154

[56] References Cited
UNITED STATES PATENTS
359,446  3/1887  Jaeger.................................. 34/152
2,589,411  3/1952  Lorig.............................. 432/59 X
2,622,860  12/1952  Lorig................................... 432/59

Primary Examiner—John J. Camby

[57] ABSTRACT

A drive mechanism is disclosed for passing continuous strips, such as rubber extrusions through a heating or curing oven. The strip enters the oven, passes around a second driven wheel mounted on a second drive shaft, then around a first driven wheel mounted on a first drive shaft. The strip then passes around a number of free wheels on, alternately, the second free shaft then the first free shaft, the free wheels being mounted rotatably on the free shafts such that the free wheels are capable of having slower rotational speeds than the respective free shafts so that the speeds of the free wheels can vary to compensate for expansion or contraction of the strips.

10 Claims, 6 Drawing Figures

DRIVE MECHANISM FOR PASSING CONTINUOUS STRIP THROUGH AN OVEN

BACKGROUND OF THE DISCLOSURE

1. Field of the Invention

The present invention relates to heating and curing ovens, and more particularly, to a drive mechanism for passing a continuous strip of meterial through such an oven. While the present invention is equally adapted for passing a strip of any type of material which must be heated through an oven, it is especially advantageous when used to cure continuous rubber extrusions, and will be discussed in connection therewith.

Rubber extrusions, of various materials and cross-sectional shapes, are widely used in many industries, one of the major ones being the automotive industry, wherein rubber extrusions are used for the weather stripping around the trunk and doors, as well as for gaskets around the windshield and rear window. The three major stages in the manufacture of these and most other rubber extrusion products are the extruding, the curing, and the subsequent cutting and assembly. The improved drive mechanism of the present invention concerns only the curing step.

2. Description of the Prior Art

The curing of continuous rubber extrusions has traditionally occurred by one of two types of processes. The first type occurs in what is known as a Ballotini oven, in which the rubber extrusion is pulled through a long trough containing heated glass beads. Because the extrusion is surrounded by the beads, the heat transfer characteristics are fairly good, but the pulling of the extrusion through the trough tends to induce stresses into the extrusion and distort it.

The second major type of extrusion curing involves a belt-type oven. The curing process normally requires three or four ovens typically 30 feet long each, with each containing an endless rotating steel belt upon which the extrusion rests. These steel belts become worn and must be replaced at great expense. An additional operating cost is the excessive amount of gas needed to heat the air in a series of three or four of these oven sections. Finally, the size of these ovens is a disadvantage in and of itself because of the large amount of factory floor space which is required, typically an area about 10 to 15 feet wide by about 90 or 120 feet long.

It has been known in the art of heating or heat treating synthetic filaments or fabrics to wind the strand about one or more rotating drums or wheels. Typical rotating roller or drum arrangements for passing a continuous strand through a heating or curing oven are shown in U.S. Pat. Nos. 2,622,860, 3,271,016, 3,387,833, and 3,554,504. This type of oven drive mechanism has not previously been considered useful in connection with items such as rubber extrusions which may undergo appreciable change (expansion or contraction) in longitudinal dimension during the heating or curing operation.

SUMMARY OF THE INVENTION

Accordingly, it is an object of the present invention to provide a drive mechanism for passing a continuous strip of material through a heating or curing oven wherein the successive wheels are capable of adjusting their rotational speeds to th growth or shrinkage of the strip, with the roller or wheel moving at about the same speed as the strip, thus minimizing the opportunity for scuffing of the strip.

It is a related object of the present invention to provide a drive mechanism for continuous strips, especially rubber extrusions, which makes it possible to utilize a more compact oven, thus permitting a substantial reduction in the required heat generation, as well as the necessary floor space.

It is a further object of the present invention to provide a curing oven for rubber extrusions which makes it possible to cure the extrusion faster and more uniformly.

These and other objects of the present invention, which will become apparent upon a reading of the following detailed description, are accomplished by the provision of a drive mechanism to pass continuous strips of material through an oven which has an inlet side, an outlet side, and a front. The drive mechanism comprises:

a. first and second drive shafts, each having a drive end and a wheel end, said shafts defining a pair of substantially parallel vertical planes, said first drive shaft adjacent the inlet side of the oven and said second drive shaft adjacent the outlet side of the oven;

b. a first free shaft, rotatably located axially with said first drive shaft and a second free shaft, rotatably located axially with said second drive shaft, each of said free shafts having a drive end and a wheel end;

c. a number of generally cylindrical substantially hollow wheels including:
 1. a first driven wheel fixedly mounted on said wheel end of said first drive shaft, a second driven wheel fixedly mounted on said wheel end of said second drive shaft; and
 2. at least one free wheel rotatably mounted on said wheel end of each of said free shafts, such that said free wheels are capable of having slower rotational speeds than said free shafts;

d. drive means operatively associated with said drive shafts and said free shafts to provide rotational movement of each of said shafts, such that each of said shafts may be rotated at a different speed than the remainder of said shafts.

DESCRIPTION OF THE PREFERRED EMBODIMENTS

Figure 1:
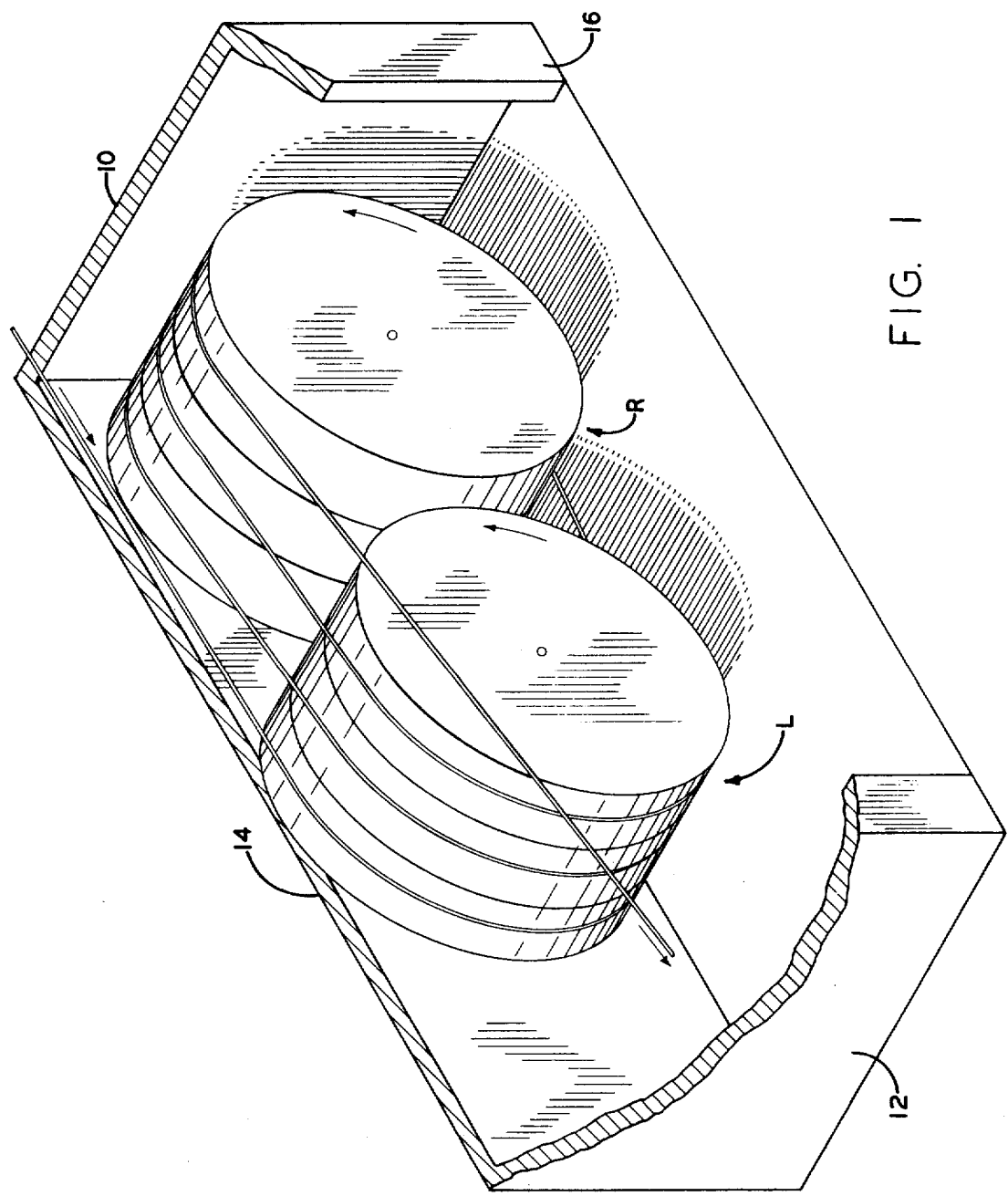
FIG. 1 is a fragmentary perspective of a portion of an oven utilizing the present invention.

Referring more specifically to the drawings, which are for the purpose of illustrating preferred embodiments of the present invention, and not for limiting the same, FIG. 1 is a fragmentary perspective of the main portion of an oven with which the subject embodiment has been utilized. The walls of such a heating or curing oven are typically made from an inner and outer layer of 16 or 18 gage hot-rolled steel, separated by an insulating layer, normally about 4 inches thick, of a material such as fiberglass or rock wool. The oven includes sidewalls 10 and 12, rear wall 14, and a front wall 16, including access doors (not shown). In FIG. 1, a strip S of continuous material is shown looping around the two sets of wheels, designated in the figure as L (left) and R (right). Each of the sets of wheels L and R is mounted on an arrangement of shafts (not shown in FIG. 1) which projects through rear wall 14 to interconnect the drive train and the set of wheels in the oven. The strip S enters the oven through an inlet (not shown) in wall 10 and, after looping about the sets of wheels L and R, exits the oven through an outlet (not shown) in wall 12.

In the subject embodiment, the sets of wheels L and R rotate in the same direction (counterclockwise arrows in FIG. 1) so that the strip S passes around the sets of wheels in an oval path. It should be clearly understood, however, that the sets of wheels L and R may rotate in opposite directions, in which case the strip S would pass about the wheels in a FIG.-8 pattern. Therefore, as used herein, the phase "around" the wheels in reference to the threading of the strip S is intended to mean and include either alternative, a combination of the two, or any similar arrangement.

Within the scope of the present invention, a means of providing heat within the oven may be any of those commonly known in the art, such as gas, and it should be understood that the present invention is in no way dependent upon the particular method of heating the oven. The heated air (dotted arrows in FIG. 2) is preferably introduced into the oven by means of a duct, such as is illustrated by the dotted lines and designated by the numeral 18 in FIG. 2. In ovens of the type shown in FIG. 1 with access doors through which the operator can enter the oven to thread the strip, it is desirable that the opening of the doors automatically shuts off the fan or closes a damper to prevent hot air from burning the operator. There should also be an exhaust fan provided in the oven compartment to draw fumes, smoke and hot air out when the doors are open.

An outlet for the hot air is preferably adjacent each set of wheels for optimum heat transfer to the strip being heated or cured. The heat ducts may extend across almost the entire width of the oven making it necessary that the shaft arrangement for each of the sets of wheels L and R project through the heat duct, in which case a sheet metal cylindrical member should be positioned in such a way as to define a passageway through the duct for the particular shaft, and a flexible sealing member or material be positioned between the shaft and the sheet metal passageway, so that heat and fumes do not escape from the oven around the shaft opening. As can be readily appreciated from viewing FIGS. 1 and 2 together, the present invention provides excellent heat transfer characteristics because as the strip passes through the oven, it is turned alternately from one side to the other, thus exposing both sides to the rising heated air. In addition, the rotating sets of wheels conduct heat uniformly to the strip. As a result, the heat transfer is not only more uniform, but also faster than with conventional ovens.

Each set of wheels L and R is driven by a pair of shafts including a drive shaft 20 (L or R) and a free shaft 22 (L or R), the functions of which will be described subsequently. The shafts 20R, 20L, 22R, and 22L are driven by a drive train of the type illustrated schematically in FIG. 3 and comprising generally a variable speed electric motor (not shown) having a motor shaft 24, plus a series of sprockets interconnected by roller chain. More specifically, the motor shaft 24 rotates drive sprocket 30 and drive sprocket 32. The roller chain 50 passing around drive sprocket 30 also passes around an idler sprocket 34 mounted on an idler shaft 26, then rotates driven sprockets 36R and 36L, which are attached, respectively, to drive shafts 20R and 20L. Drive sprocket 32 rotates auxiliary driven sprocket 40 by means of roller chain 52. Sprocket 40 drives auxiliary driven sprocket 42 by means of auxiliary shaft 28. In turn, sprocket 42 rotates driven sprocket 44 by means of roller chain 54. Driven sprocket 44 is attached to free shaft 22R, which also has attached thereto another driven sprocket 46R which rotates driven sprocket 46L by means of roller chain 56. For reasons which will be more fully explained subsequently, driven sprockets 36R and 36L may be the same size, as in FIG. 3, in which case drive shafts 20R and 20L will rotate at the same speed, or the sprockets 36R and 36L may be of different sizes. This also applies to driven sprockets 46R and 46L.

Figure 3:
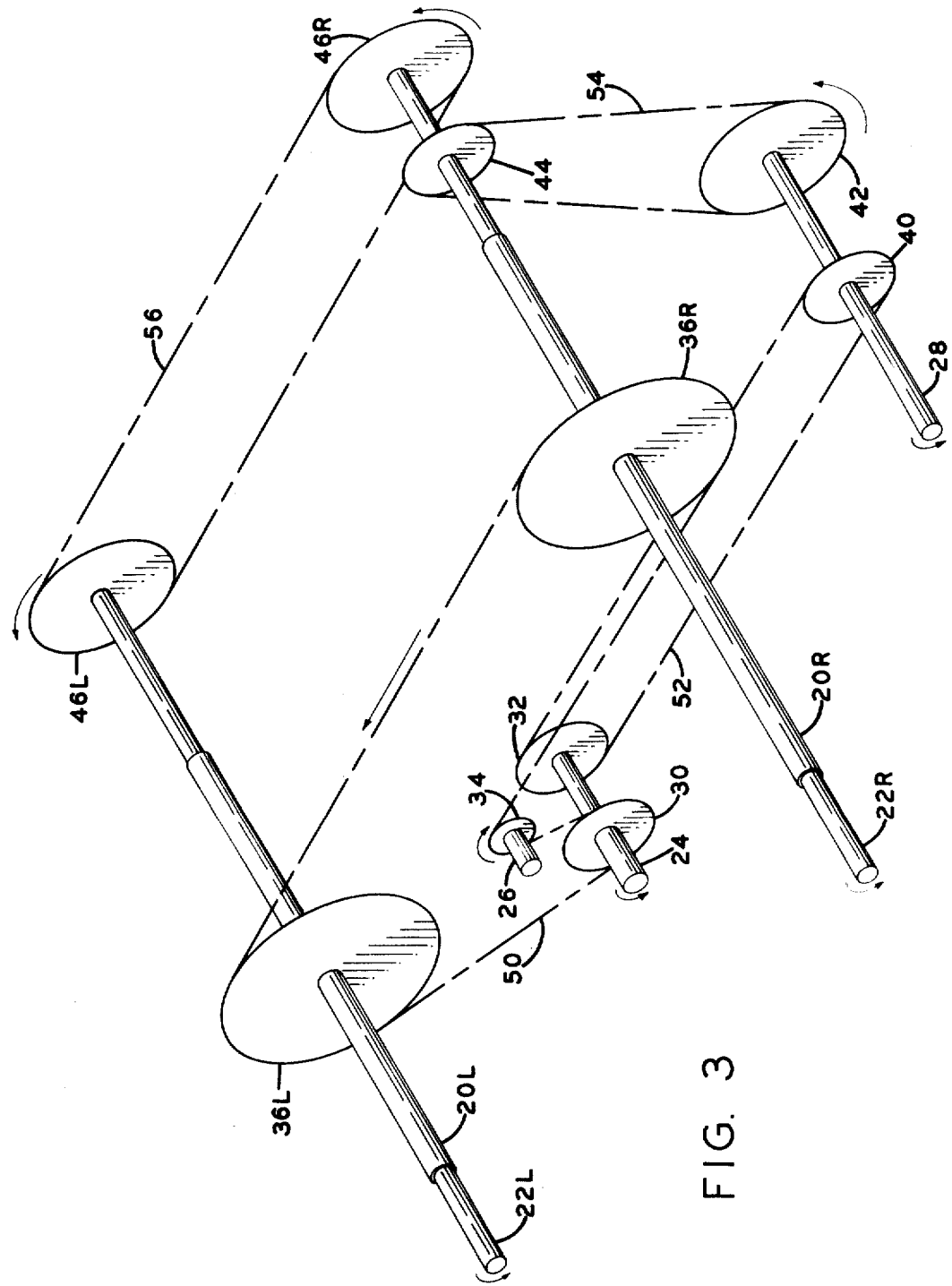
FIG. 3 is a schematic perspective of a preferred drive train.
Figure 4:
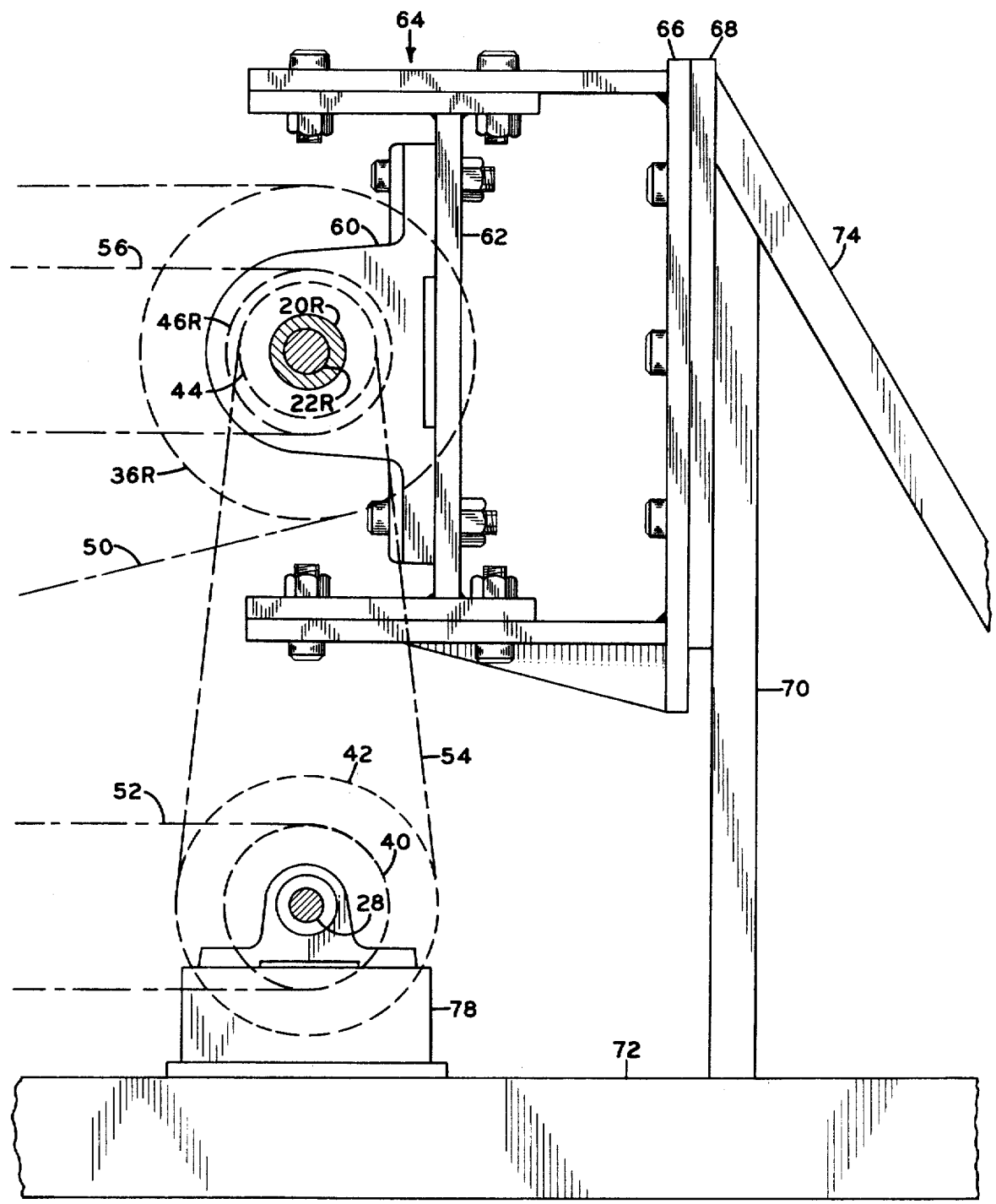
FIG. 4 is a front view, partially in schematic form, of the drive train and framework, on the same scale as FIG. 2.
Figure 5:
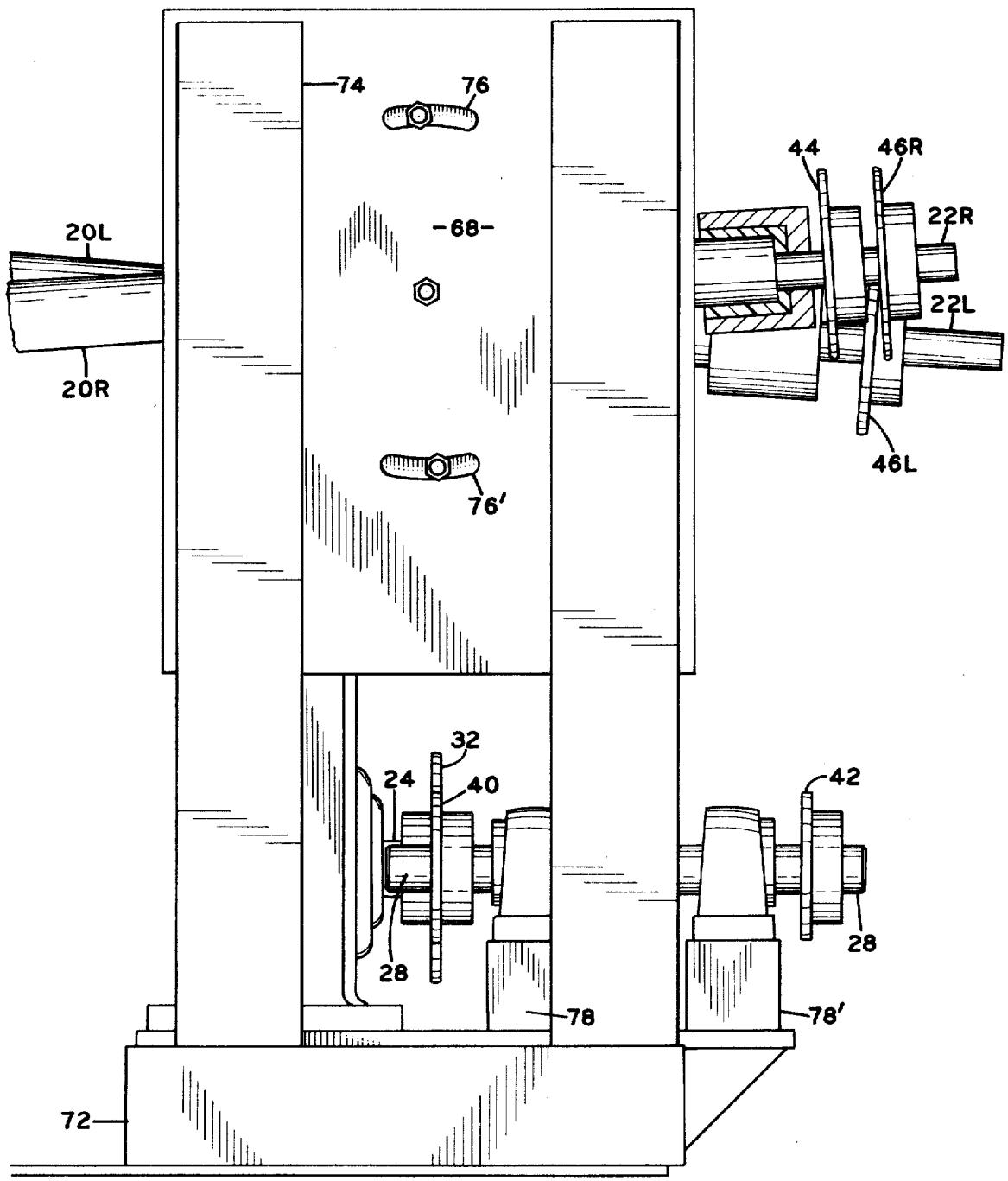
FIG. 5 is a right-hand elevation of the drive train and framework of FIG. 4, and on the same scale.

The drive train of FIG. 3 should be viewed in conjunction with the supporting framework illustrated in FIGS. 4 and 5 and positioned behind rear wall 14 of FIG. 1, exterior to the oven. In viewing FIG. 4, it should be understood that the framework shown therein for supporting shafts 20R and 22R is a mirror image of the framework used to support shafts 20L and 22L. Drive shaft 20R (and free shaft 22R which rotates inside 20R) are supported by a pillow-block ball bearing (Fafnir bearing) 60 which is bolted to vertical plate 62 of the right-hand bracket 64, which is welded to mounting plate 66. Support plate 68 is welded to vertical frame member 70, resting upon bottom frame member 72, and the entire framework is strengthened by support member 74 which extends at an angle to bottom frame member 72. As is best shown in FIG. 5 (which omits the roller chains), support plate 68 includes curved slots 76 and 76' so that the whole assembly of bracket 64 and mounting plate 66 may be rotated several degrees from the horizontal. Therefore, in the embodiment of FIG. 5, shafts 20R and 22R are angled downwardly toward the front of the oven (to the left) and shafts 20L and 22L are angled upwardly toward the front. In addition to this structure, which is duplicated on the left side also, FIG. 4 illustrates the pillow-block ball bearings 78 and 78' used to support auxiliary shaft 28.

Referring again to FIG. 2, the sets of wheels R and L are illustrated, in greater detail, as comprising driven wheels 80R and 80L and two free wheels 90 (R and L) per set. Driven wheel 80 comprises a cylindrical wheel hub 82 fitting closely about drive shaft 20 and held in rigid relationship thereto by means of a set screw (not shown) so that the hub 82 is not free to rotate with respect to the shaft 20. Extending radially outward from the hub 82 is a plurality of reinforcing pipes 84, welded to the hub 82 and to the outer ends of pipes 84 is welded cylindrical outer member 86, preferably comprising a cylindrical strip of relatively heavy gage sheet metal. It is normally desirable that the outer member 86 be perforated, or contain openings of some sort, so that rising hot air is free to pass upward through the rotating wheels as is illustrated by the dotted arrows in FIG. 2. Note that for ease of illustration FIG. 1 shows the wheels as having solid end faces whereas they are preferably as in FIG. 2 with the outer member (86 or 96) having only a flange on each side bent radially inward. The term "driven wheel" is used in reference to wheels 80R and 80L because they are preferably attached, respectively, to drive shafts 20R and 20L in such a way that they are directly driven by their respective shafts and rotate at the same speed as the shaft. By contrast, the term "free wheels" is used in reference to wheels 90R and 90L to indicate that they may be, and preferably are, free to rotate at a different speed than their respective free shafts 22R and 22L. Each of the wheels 90 comprises a cylindrical wheel hub 92 which, unlike wheel hub 82, does not fit tightly about the adjacent shaft, but has a cylindrical bearing 100 preferably made from a material such as polytetrafluoroethylene, (sold under the trademark TEFLON by du Pont) between free shaft 22 and wheel hub 92. The term "free shaft" is used in reference to shafts 22R and 22L merely to indicate that it is upon these shafts that the "free wheels" are mounted. Otherwise, each free wheel 90 is constructed similar to driven wheel 80, including a series of reinforcing pipes 94 welded to the hub 92, and to the outer ends of pipes 94 is welded the cylindrical outer member 96.

Because the free shaft 22 rotates within drive shaft 20, a bearing housing 102 is held tightly in contact with free shaft 22 by means of a set screw (not shown), and within the bearing housing is a cylindrical Teflon bearing 104 and a washer-shaped Teflon bearing 106. Additional washer-shaped Teflon bearings 108 are used as lateral spacers to insure the unhindered rotation of the wheels with respect to each other. At the end of each of the free shafts 22R and 22L is a threaded portion onto which is threaded a castle nut 110 holding washer 112 against bearing 108.

Figure 2:
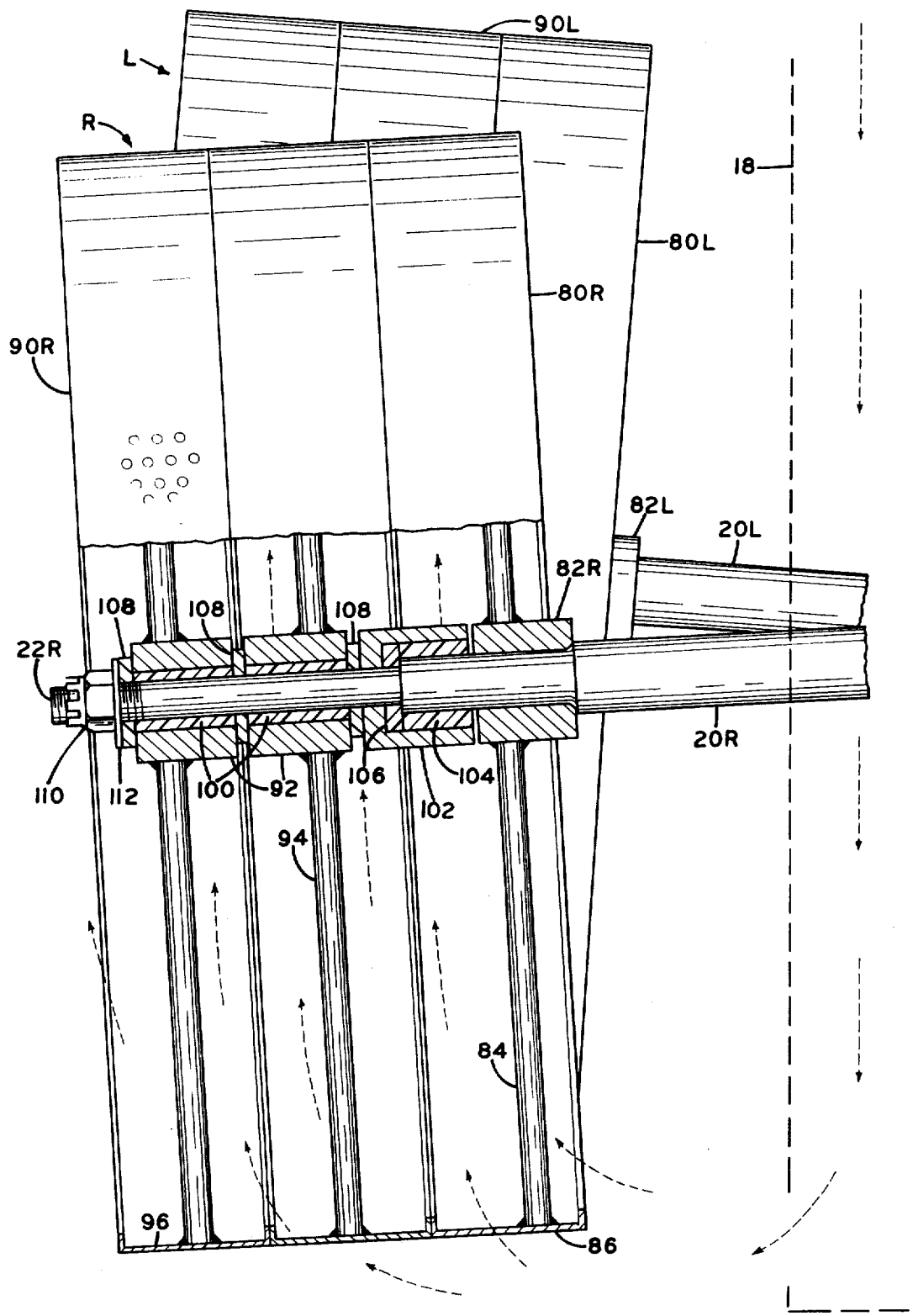
FIG. 2 is a fragmentary elevation of the wheels of the present invention.

In operation, and more specifically in use for curing rubber extrusions, the extrusion or strip S may enter an oven made in accordance with the present invention either through a straight steel-belt or Ballotini-type oven to preheat the extrusion or it may enter the oven described herein directly from the extruder. As mentioned previously, the shafts are preferably angled as shown in FIG. 2, if the strip S enters from the right and exits from the left as shown in FIG. 1 (travels into the page in FIG. 2). The purpose of the illustrated angles is to cause the strip to "walk" or "step over" as it passes, for example, around wheel 80L, then toward the viewer (in FIG. 2) from the bottom of 80L, around wheel 80R, then into the page and around 90L, etc. The ability of the free wheels to rotate faster (or slower) than the driven wheels allows for longitudinal expansion (or contraction) of the strip. In the case of a rubber extrusion, it is important that the linear speed of the extrusion be equal to the surface speed of the wheel over which it is passing because any slipping or sliding of the extrusion with respect to the wheel may scuff the uncured extrusion. For this reason, the individual wheels must be able to change speed in an unpredictable manner to keep pace with any sudden expansion of the extrusion.

Because, in this subject embodiment, the strip passes first around wheel 80L, the around 80R, it is preferable to rotate drive shaft 20R at a speed from about 1.0 to about 1.2 times the speed at which drive shaft 20L is rotated. This differential takes into account an early growth of the extrusion, and can be accomplished easily by changing the size of driven sprocket 46L and/or 46R based upon empirical observations of the changes in the extrusion. Similarly, the speed ranges within which the free wheels are rotatable should be based largely on experimentation and observation of a particular extrusion under the particular curing conditions (temperature, etc.). Typically the speed of rotation of each free shaft is from about 1.2 to about 1.8 times, and preferably about 1.5 times the speed of rotation of its associated drive shaft (e.g., free shaft 22R is associated with drive shaft 20R). Obviously, the actual speed of rotation of each free wheel will depend on the frictional force between the free shaft and (indirectly) the wheel hub, but is will also depend on the speed of the extrusion, which may either slow down or speed up the wheel.

Figure 6:
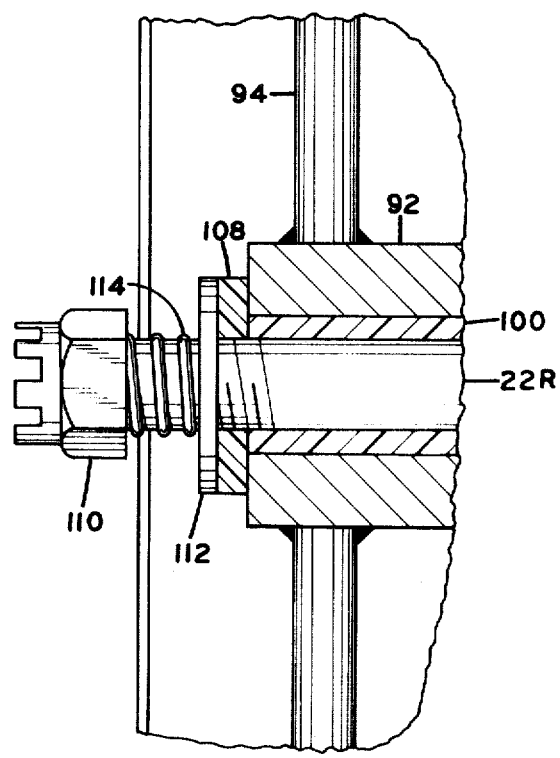
FIG. 6 is a fragmentary view similar to a portion of FIG. 2, on a larger scale, illustrating an alternative embodiment.

FIG. 6 illustrates an alternative embodiment in which an adjustable drag means, in this case a compression spring 114, has been positioned about the threaded portion of shaft 22R between castle nut 110 and washer 112. As the spring 114 is compressed it exerts a greater force against the washer, thus increasing the fractional force between bearing 108 and bearing 100 and between bearing 108 and wheel hub 92 and thus, indirectly, between hub 92 and shaft 22. In this embodiment, the castle nut 110 should be prevented from unthreading, as for example, by means of a cotter pin (not shown).

It should be clearly understood that the present invention is in no way limited to the arrangement of wheels and the angles illustrated in FIGS. 1 and 2, but rather it is within the scope of the invention to utilize any number of wheels as long as there is one driven wheel and at least one free wheel per "set" of shafts (e.g., 20R and 22R comprise one "set" of shafts). It is also contemplated that the sets of wheels L and R may be in a different relationship with respect to each other than that shown in FIG. 1. Alternatively, they may be arranged in a vertical line or at some angle between the horizontal and the vertical. Finally it may be desirable under certain circumstances to use more than two sets of wheels, especially if it is determined that an exceedingly long path is required within the oven in order to cure the strip or extrusion. If that is the case, any number of sets of wheels may be positioned in the oven, and at any one of many possible orientations. The cure time spent in the oven may also be varied by changing the sizes of the wheels, with the larger wheels increasing the path of travel of the strip. The practial limitation on the size of the wheels will be the space requirements as well as the rigidity of the shafts and related bearings and framework. It may even be desirable occasionally to provide two different temperature zones for heating or curing a continuous strip, in which case two or more of these ovens may be in series with each maintained at a different temperature. It can be readily appreciated that the oven of the present invention provides a great advantage over the conventional in-line or straight oven, especially where the size or configuration of the strip requires a long path or a long time for the desired heating or curing.

It has been found in developing this oven that it may be utilized advantageously with generally any type of strip or extrusion, including such materials as rubber, fabric, plastic, etc., the only exception or limitation being in the case of certain configurations of rubber extrusion wherein bending the extrusion around the wheels tends to cause it to collapse or distort. It should be noted that in curing such extrusions in accordance with the present invention, these problems can be minimized by the use of a smaller number of relatively larger wheels, thereby maintaining the total path length (and cure time), while increasing the radius of the curvature to which the extrusion is subjected and thus the potential distortion.

The invention has been described in great detail sufficient to enable one of ordinary skill in the art to make and use the same. Obviously, modifications and alterations of the preferred embodiments will occur to others upon a reading and understanding of the specification and it is my intention to include all such modifications and alterations as part of my invention insofar as they come within the scope of the appended claims.

What is claimed is:

1. In an oven for heating an elongated strip of material, the oven including an inlet side, an outlet side, a front, and drive mechanism to pass the strip through the oven, said drive mechanism comprising:
   a. first and second drive shafts, each having a drive end and a wheel end, said shafts defining a pair of substantially parallel vertical planes, said first drive shaft adjacent the inlet side of the oven and said second drive shaft adjacent the outlet side of the oven;
   b. a first free shaft, rotatably located axially with said first drive shaft and a second free shaft, rotatably located axially with said second drive shaft, each of said free shafts having a drive end and a wheel end;
   c. a number of generally cylindrical substantially hollow wheels including:
      i. a first driven wheel fixedly mounted on said wheel end of said first drive shaft, a second drive wheel fixedly mounted on said wheel end of said second drive shaft; and
      ii. at least one free wheel rotatably mounted on said wheel end of each of said free shafts, each of said free wheels being adapted to rotate at slower rotational speeds than said free shafts;
   d. drive means operatively associated with said drive shafts and said free shafts to provide rotational movement of each of said shafts, each of said shafts being adapted to rotate at a different speed than the remainder of said shafts.

2. The apparatus of claim 1 wherein said first drive shaft and said first free shaft are angled downwardly toward the front of the oven and wherein said second drive shaft and said second free shaft are angled upwardly toward the front of the oven, said wheels being adapted to have the elongated strip form a succession of loops, entering the oven from the inlet side, passing adjacent said first wheel, around said second driven wheel, around said first driven wheel, then around said free wheels on, alternately, said second free shaft then said first free shaft, the strip passing from the oven on the outlet side after passing around all of said free wheels; said free wheels being adapted to rotate at such a speed, in relation to said driven wheels, that longitudinal expansion or contraction of said strip does not cause, respectively, slack or tension in said strip.

3. The apparatus of claim 1 wherein said first and second drive shafts are hollow, said first free shaft is longer then said first drive shaft and is located therein and said second free shaft is longer than said second shaft and is located therein.

4. The apparatus of claim 1 wherein said first driven wheel is provided to be rotated at a speed from about 1.0 to about 1.2 times the speed of said second driven wheel.

5. The apparatus of claim 1 wherein said first and second free shafts are provided to be rotated at speeds from about 1.2 to about 1.8 times the speeds of said first and second drive shafts, respectively.

6. The apparatus of claim 1 wherein each of said wheels comprises a central hub, support means extending radially from said hub, and a cylindrical outer member attached to said support means and comprising a thickness of material defining a plurality of holes, such that heated air within the oven may rise, passing through said holes and providing more uniform and efficient heat transfer to the elongated strips.

7. A drive mechanism especially suited for passing a continuous, rubber extrusion through a curing oven having an inlet side, an outlet side, a front and a rear, said drive mechanism comprising:
   a. first and second hollow drive shafts, each having a drive end adjacent the rear of the oven and a wheel end adjacent the front of the oven, said shafts defining a pair of substantially parallel vertical planes, said first drive shaft angled downwardly toward the front of the oven and said second drive shaft angled upwardly toward the front of the oven;
   b. a first free shaft rotatably positioned within said first drive shaft, a second free shaft rotatably positioned within said second drive shaft, said first and second free shafts being longer than said first and second drive shafts, respectively, each of said free shafts having a drive end adjacent the rear of the oven and a wheel end projecting toward the front of the oven, beyond the wheel end of the respective drive shaft;
   c. a number of generally cylindrical subsantially hollow wheels including;
      i. a first driven wheel fixedly mounted on said wheel end of said first drive shaft, a second driven wheel fixedly mounted on said wheel end of said second drive shaft; and
      ii. at least two free wheels rotatably mounted on said wheel end of each of said free shafts, said free wheels being adapted to rotate at slower rotational speeds than said free shafts;
   d. drive means operatively associated with said drive shafts and said free shafts to provide rotational movement of each of said shafts, said first driven wheel being adapted to rotate at a speed from about 1.0 to about 1.2 times the speed of said second driven wheel, and said first and second free shafts being adapted to rotate at speeds from about 1.2 to about 1.8 times the speeds of said first and second drive shafts, respectively, the arrangement being such that as the rubber extrusion enters the oven from the inlet side, passes around said second driven wheel, around said first driven wheel, around said free wheels on, alternately, said second free shaft then said first free shaft, said free wheels being adapted to rotate with varying speeds to compensate for sudden longitudinal expansion of the extrusion during curing.

8. In a drive mechanism adapted to pass a continuous rubber extrusion through a curing oven, the mechanism including first and second generally cylindrical members, mounted respectively on first and second drive shafts, their axes of rotation defining a pair of substantially parallel planes, the improvement wherein:
   a. the first cylindrical member comprises a first driven wheel fixedly mounted on the first drive shaft and at least one first free wheel rotatably mounted on a first free shaft positioned axially with the first drive wheel; and
   b. the second cylindrical member comprises a second driven wheel fixedly mounted on the second drive shaft and at least one second free wheel rotatably mounted on a second free shaft positioned axially with the first drive wheel;
   c. drive means operatively associated with said drive shafts and said free shafts to provide rotational movement of each of said shafts, each of said shafts being adapted to rotate at a different speed than the remainder of said shafts, thereby being capable of compensating for any longitudinal expansion of the extrusion during curing; and
   d. a first low friction bearing being positioned between said first free wheel and said first free shaft, and a second low-friction bearing being positioned between said second free wheel and said second free shaft, whereby each of said free wheels is adapted to rotate at a slower rotational speed than its respective free shaft.

9. The improvement of claim 8 wherein a first low friction bearing is positioned between said first free wheel and said first free shaft, and a second low-friction bearing is positioned between said second free wheel and said second free shaft, whereby each of said free wheels has a slower rotational speed than its respective free shaft.

10. The improvement of claim 8 wherein at least one of said free wheels and its respective free shaft has adjustable drag means associated therewith, whereby the rotational friction between said free wheel and said free shaft can be changed thereby proportionately changing the rotational speed of said free wheel relative to the rotational speed of said free shaft.

* * * * *